United States Patent [19]

Hanseler et al.

[11] Patent Number: 5,486,745
[45] Date of Patent: Jan. 23, 1996

[54] METHOD AND APPARATUS FOR SYNCHRONIZING SYSTEM OPERATIONS USING A PROGRAMMABLE ELEMENT

[75] Inventors: Ralph S. Hanseler, Andover; Michael D. Healy, Boston, both of Mass.

[73] Assignee: Miles Inc., Wilmington, Mass.

[21] Appl. No.: 131,726

[22] Filed: Oct. 5, 1993

[51] Int. Cl.⁶ ............................ G11B 5/596; G05B 11/18
[52] U.S. Cl. .......................... 318/561; 318/592; 318/603; 358/296
[58] Field of Search ...................... 318/17–89, 560–696; 358/78, 296; 360/72–78; 369/50; 355/53, 55

[56] References Cited

U.S. PATENT DOCUMENTS

| | | | |
|---|---|---|---|
| 4,388,653 | 6/1983 | Yamada | 358/302 |
| 4,454,537 | 6/1984 | Okada et al. | 358/77 |
| 4,530,018 | 7/1985 | Hoshino et al. | 360/73 |
| 4,601,568 | 7/1986 | Takano et al. | 355/8 |
| 4,605,957 | 8/1986 | Yamada | 358/78 |
| 4,644,232 | 2/1987 | Nojiri et al. | |
| 4,724,370 | 2/1988 | Mararu et al. | 318/561 |
| 4,811,133 | 3/1989 | Nakadai et al. | 318/592 |
| 4,866,477 | 9/1989 | Barry et al. | 355/55 |
| 4,959,599 | 9/1990 | Nakadai et al. | 318/603 |
| 5,041,716 | 8/1991 | Wakabayashi | 219/121.68 |
| 5,093,820 | 3/1992 | Maeda et al. | 369/50 |
| 5,115,256 | 5/1992 | Miyagi et al. | 358/296 |
| 5,212,648 | 5/1993 | Sugita et al. | 318/561 |
| 5,289,231 | 2/1994 | Magome et al. | 355/53 |
| 5,307,648 | 5/1994 | Forkert et al. | 66/207 |

FOREIGN PATENT DOCUMENTS

| | | |
|---|---|---|
| 0030302 | 6/1981 | European Pat. Off. . |
| 0057586 | 8/1982 | European Pat. Off. . |
| 2032649 | 5/1980 | United Kingdom . |
| 2140175 | 11/1984 | United Kingdom . |

*Primary Examiner*—Paul Ip
*Attorney, Agent, or Firm*—John A. Mericki

[57] ABSTRACT

A method and apparatus for synchronizing the operation of multiple elements of a system to the motion of a movable element using a programmable element as the control element.

13 Claims, 5 Drawing Sheets

5,486,745

METHOD AND APPARATUS FOR SYNCHRONIZING SYSTEM OPERATIONS USING A PROGRAMMABLE ELEMENT

FIELD OF THE INVENTION

The present invention relates to the refinement of the control of multiple operating elements where a movable element is used as the reference for synchronizing all other operating elements within the system.

BACKGROUND OF THE INVENTION

In previously implemented motion control systems synchronization was performed through analog methods or a discretely implemented state machine as opposed to a programmable element.

Analog methods previously used were susceptible to electrical noise, and as such produced errors in position and velocity. Initial analog implementations controlled the velocities of each axis but did nothing to control the relative position of the axes.

The use of a hardware based state machine for this application was driven in part from the synchronization requirement. The state machine approach provides synchronization. This implementation is typically unwieldy, complex and lacks versatility. This approach usually produced circuitry that was in many cases redundant, used multiple unsynchronized timing references, and the completed design lacked flexibility such that it was not easily modified for use on subsequent designs.

Since the advent of programmable elements, their inherent ability to be programmed made them seem ideal as a replacement for the state machine. They would then allow for rapid development, low cost, and enhanced flexibility over the hardware state machine previously mentioned. Unfortunately, synchronization between a movable element and the crystal oscillator clock of the programmable element could not be assured.

It is, accordingly, a general object of the invention to provide a method and apparatus for synchronizing a movable element and one or more operating elements.

It is a specific object of the invention to provide a method and apparatus for synchronizing a movable element and one or more operating elements utilizing a programmable element having as an input a signal representative of the position of the movable element.

It is another object of the invention that the synchronization method and apparatus can be operated in either an open or closed loop mode.

It is still another object of the invention that the synchronization method and apparatus can be synchronized to either the relative or absolute position of the movable element.

It is a further object of the invention that the operating element or elements can be controlled directly or indirectly by a control signal or signals from the programmable element.

SUMMARY OF THE INVENTION

The control system provides for the synchronization of at least one operating element that has a desired relationship relative to a movable element. The movable element is set into motion in a prescribed and controlled manner. A reference signal is derived from the movable element such that the reference signal is representative of the position of the movable dement. This reference signal can represent either the absolute position or relative position of the movable element. This reference signal is applied to the input of a programmable element. The programmable element processes this reference signal to generate control signal(s) for the desired control state of the operating element(s). The control signal(s), either directly or indirectly, control the operating element(s).

DETAILED DESCRIPTION OF THE INVENTION

The invention relates to the synchronization of the operation of an operating element to a single master movable element.

Figure 1:
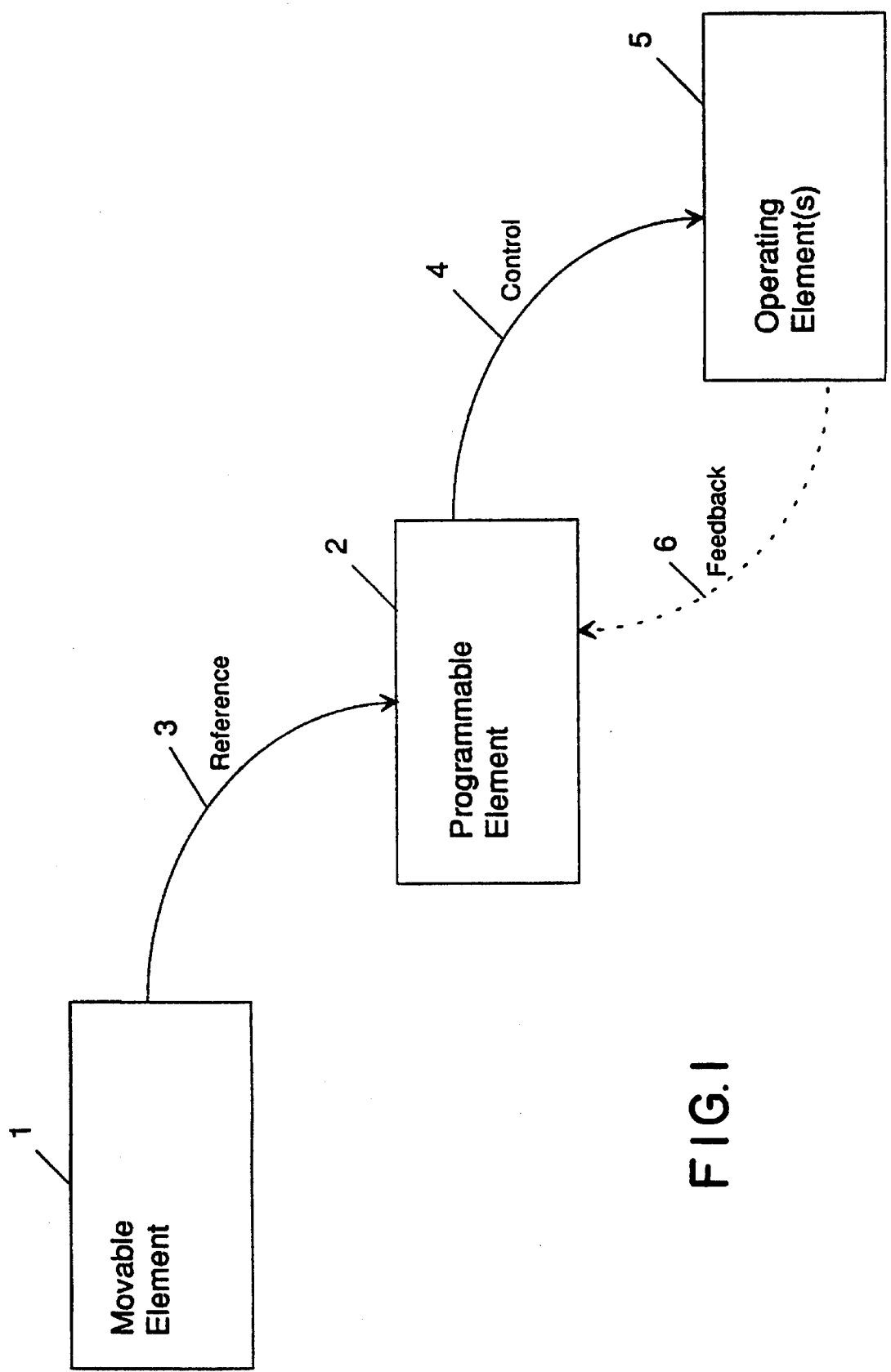
FIG. 1 is a Block Diagram of the control system.

Referring to FIG. 1, the movable dement 1 is driven and a signal is derived from the movable element 1 that is representative of the position of the movable element 1. This signal is applied to an input of a programmable element 2 as its reference 3. The programmable element 2 processes this input signal to generate control signal(s) 4 for the operating element(s) 5 of the system. The motion of the movable element 1 is rotary, linear or any other form of motion from which a signal can be derived that is representative of the position of the movable element 1.

The term "programmable element", as used herein, means a device comprising at least an arithmetic logic unit (ALU), temporary storage and access to program storage.

The operating element 5 is controlled by the programmable element 2 to have a predetermined relationship relative to the movable element 1. This relationship may be any function of the reference 3 signal derived from the movable element 1.

Figure 2:
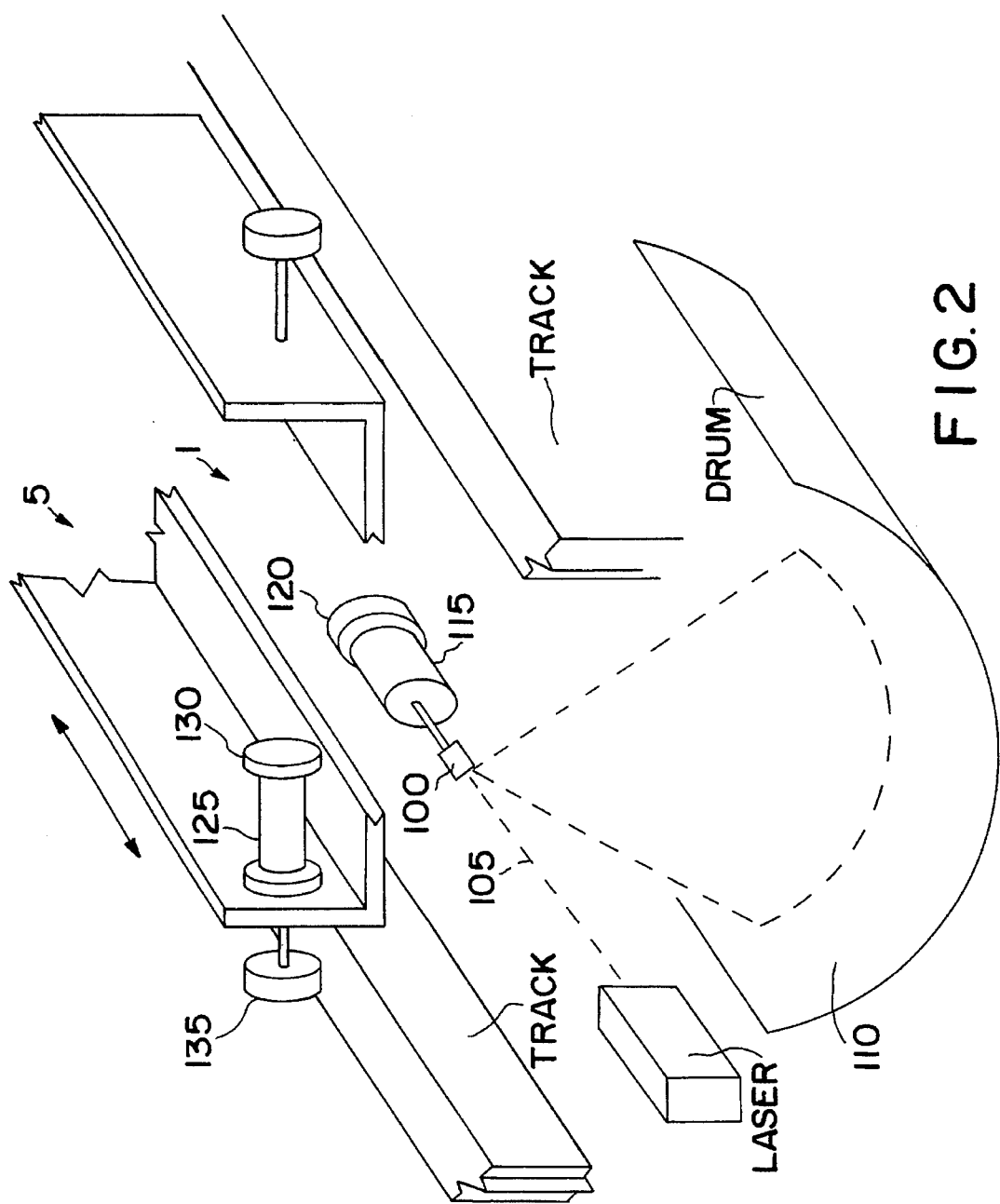
FIG. 2 is a simplified perspective view of the movable and operating elements of the preferred embodiment
Figure 3:
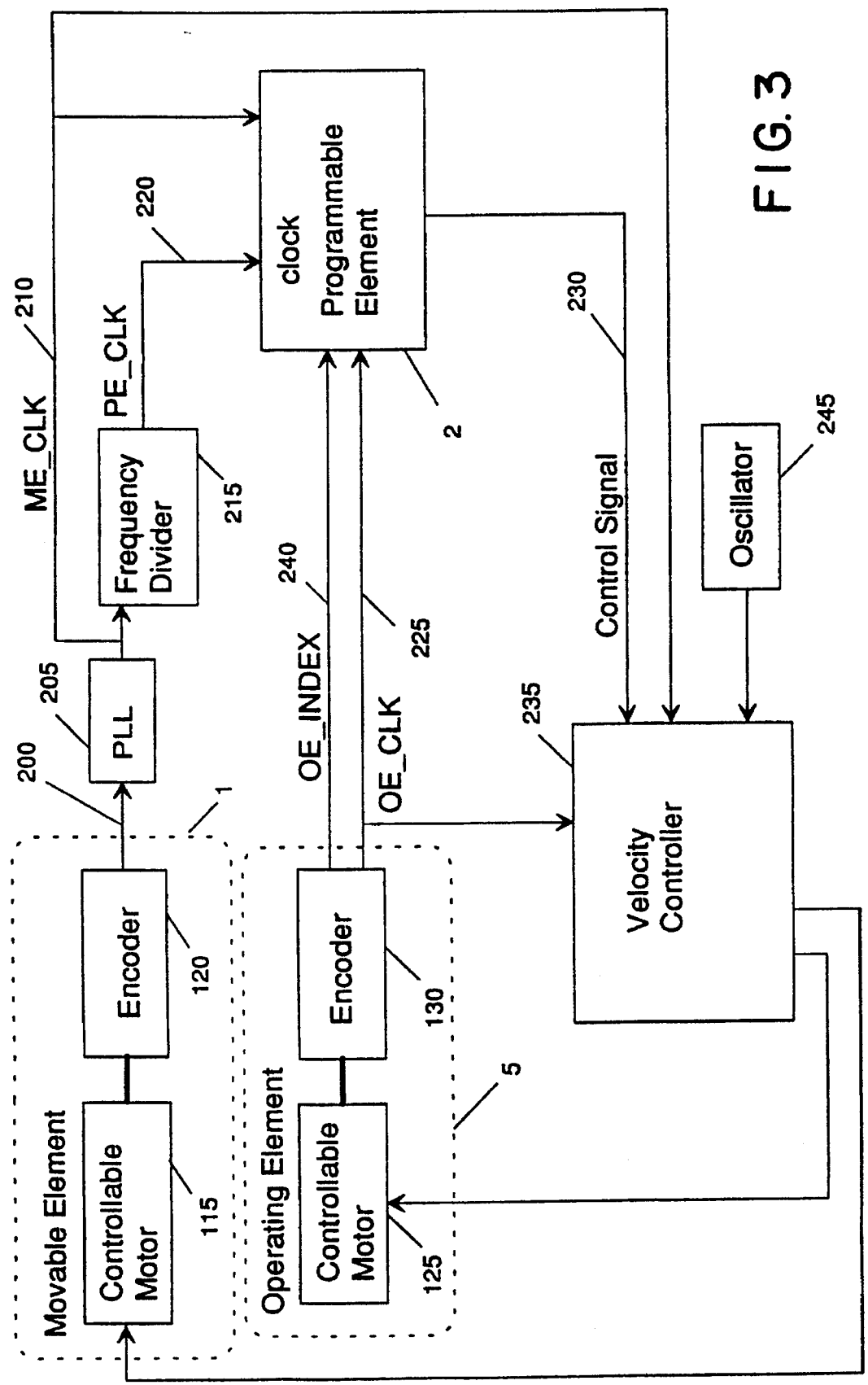
FIG. 3 is a Block Diagram of the preferred embodiment of the control system.

The invention has a preferred embodiment in image printing systems where two orthogonal axes of motion scan a stationary imaging media 110 with a laser beam 105, as shown in FIG. 2 and FIG. 3.

The movable element 1 is comprised of a rotating mirror 100 that deflects laser beam 105 onto a stationary imaging media 110. The mirror 100 is driven by a controllable motor 115 through either a direct or indirect coupling. The mirror 100 motion controls the position (scanning) of the writing laser beam 105 on the imaging media 110. A signal is derived from the position of the mirror 100 via an encoder 120. This signal is then representative of the motion of the writing laser beam 105 placing the image on the imaging media 110. The encoder output 200 (FIG. 3) is applied to the input of a phase lock loop 205. The output of the phase lock loop (ME_CLK) 210 is a signal which is a multiple of the frequency of the input signal and has a fixed phase relationship with the input signal. The output of the phase lock loop 210 is applied to an input of frequency divider 215 and to an input of the programmable element 2. The frequency divider 215 generates a clock signal (PE_CLK) 220 of appropriate frequency for the programmable element 2. However, it should be understood that the mirror derived signal, encoder output 200, can be directly applied to the input of the programmable element 2 without using a phase lock loop 205. The movable element 1 is moved by the operating element (carriage assembly) 5 (FIG. 2) in an axis parallel to its axis of rotation such that the laser beam 105 traces out a series of raster lines on the imaging media 110. The relationship of the operating element 5 to the rotating mirror 100 is one of distance traversed by the operating element 5 per revolution of the mirror 100. This relationship defines the geometry of the image placed on the imaging media 110. The operating element 5 is driven by a controllable motor 125 via coupling that can be direct or indirect. A signal (OE_CLK) 225 is derived from the controllable motor 125 via an encoder 130 that is representative of its position and the position of the operating element 5. The OE_CLK 225 signal is supplied to an input of the programmable element 2.

A representative example of the programmable element 2 is the industry standard Motorola 68HC11 microcontroller. The clock (PE_CLK) 220 for the programmable element is derived from the phase lock loop 205. This allows the programmable element 2 to operate synchronously with the motion of the movable element (rotating mirror assembly) 1, generate a reference signal for the operating element (carriage assembly) 5 that is synchronous with the motion of the movable element 1, and generate a control signal (position error) 230 for the operating element 5 that causes the signal (OE_CLK) 225 derived from the motion of the carriage assembly 5 to have minimal error from the generated reference signal for the operating element 5. However, it should be understood that the mirror derived signal 200 (input to the phase lock loop) can be applied directly to the clock of the programmable element 2 without using a phase lock loop 205.

During the imaging process the operating element 5 is set into motion. The programmable element 2 monitors the motion of the movable element 1 and controls the motion of the operating element 5 to track the motion of the movable element 1 with a desired relationship. This is accomplished by the programmable element 2 generating a reference signal for the operating element 5 by processing the reference signal (ME_CLK) 210 derived from the movable element 1 representative of its position. This processing results in a reference signal for the operating element 5 that has the desired relationship to the position of the movable element 1, and is synchronous with the motion of the movable element 1. The programmable element 2 compares the reference signal for the operating element to a feedback signal (OE_CLK) 225 derived from the operating element 5 and computes a control signal 230 that represents the position error between the two signals. The control signal 230 is transmitted to velocity controller 235 where it is used to adjust the velocity of the operating element 5 such that the position error is maintained at a minimal value. This results in the image placed on the imaging media 110 having a geometry devoid of aberrations caused by asynchronous motion of the two independent axes.

The control signal 230 contains a position error magnitude and a lead/lag flag representative of the relative position of operating element 5 with respect to the movable element 1. The lead/lag flag allows the velocity controller 235 to determine if the speed of the operating element 5 (carriage assembly) is too fast or too slow (e.g. consecutive position errors of increasing magnitude and leading phase suggest that the velocity of the operating element 5 is too fast).

Figure 4:
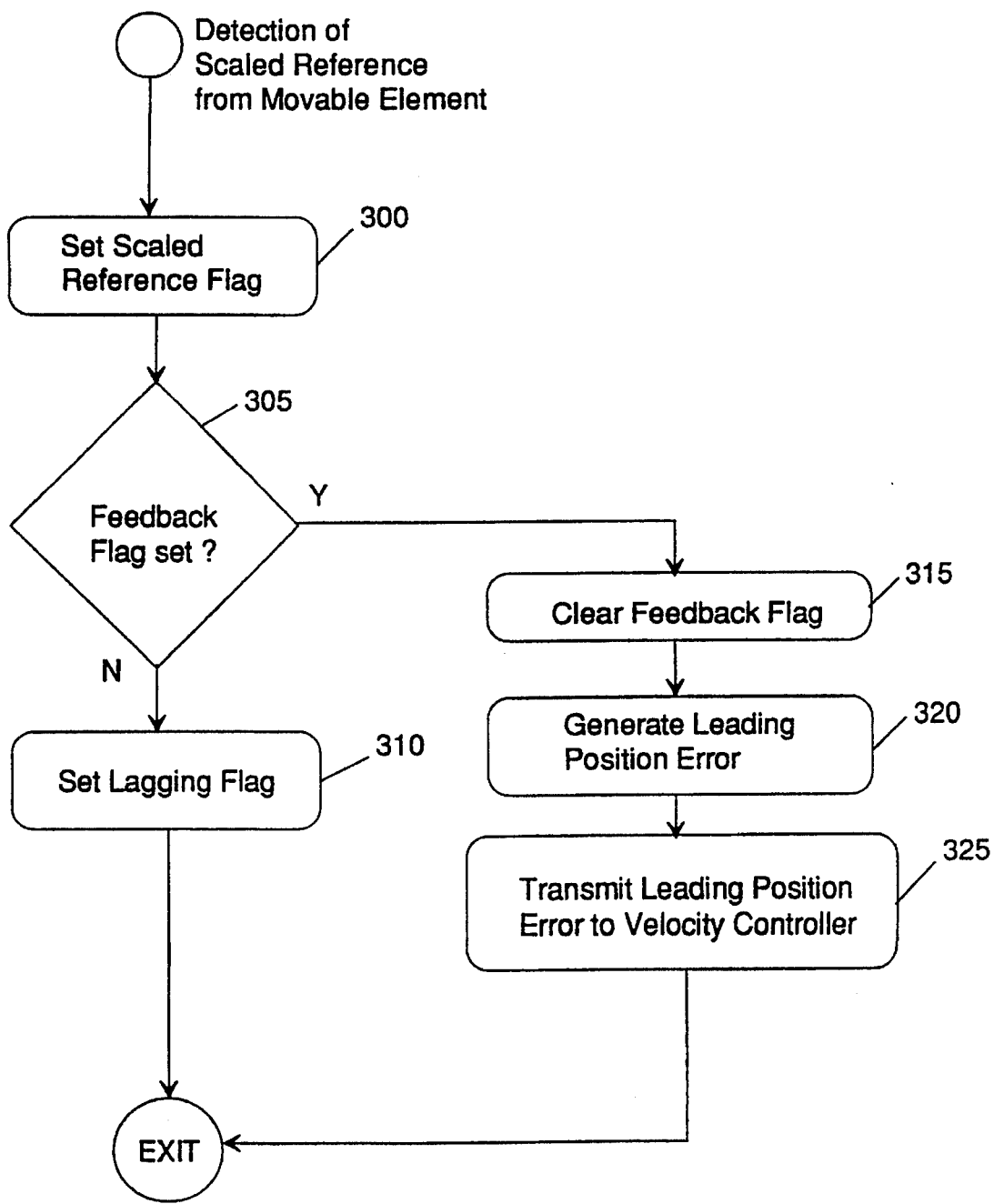
FIG. 4 is a flow chart of programmable element activity for a reference signal.

FIG. 4 is representative of the action of the programmable element 2 in processing the scaled reference signal for the operating element 5 which is derived from the movable element reference (ME_CLK) 210. The scaled reference signal is examined by the programmable element 2 at these predetermined positions. At these positions the programmable element 2 sets scaled reference flag 300 and checks if the feedback flag is set 305. If the feedback flag is not set then two scaled reference signal positions have occurred in sequence, without an intervening feedback signal position occurring, meaning the operating element 5 is lagging the scaled reference signal. The programmable element then sets 310 the lagging flag. If the feedback flag is set the programmable element clears the feedback flag 315, and generates a leading position error 320 signal based on this scaled reference signal occurrence, the previous feedback signal occurrence, and a leading flag and transmits this leading position error 325 (via control signal 230) to the velocity controller 235.

Figure 5:
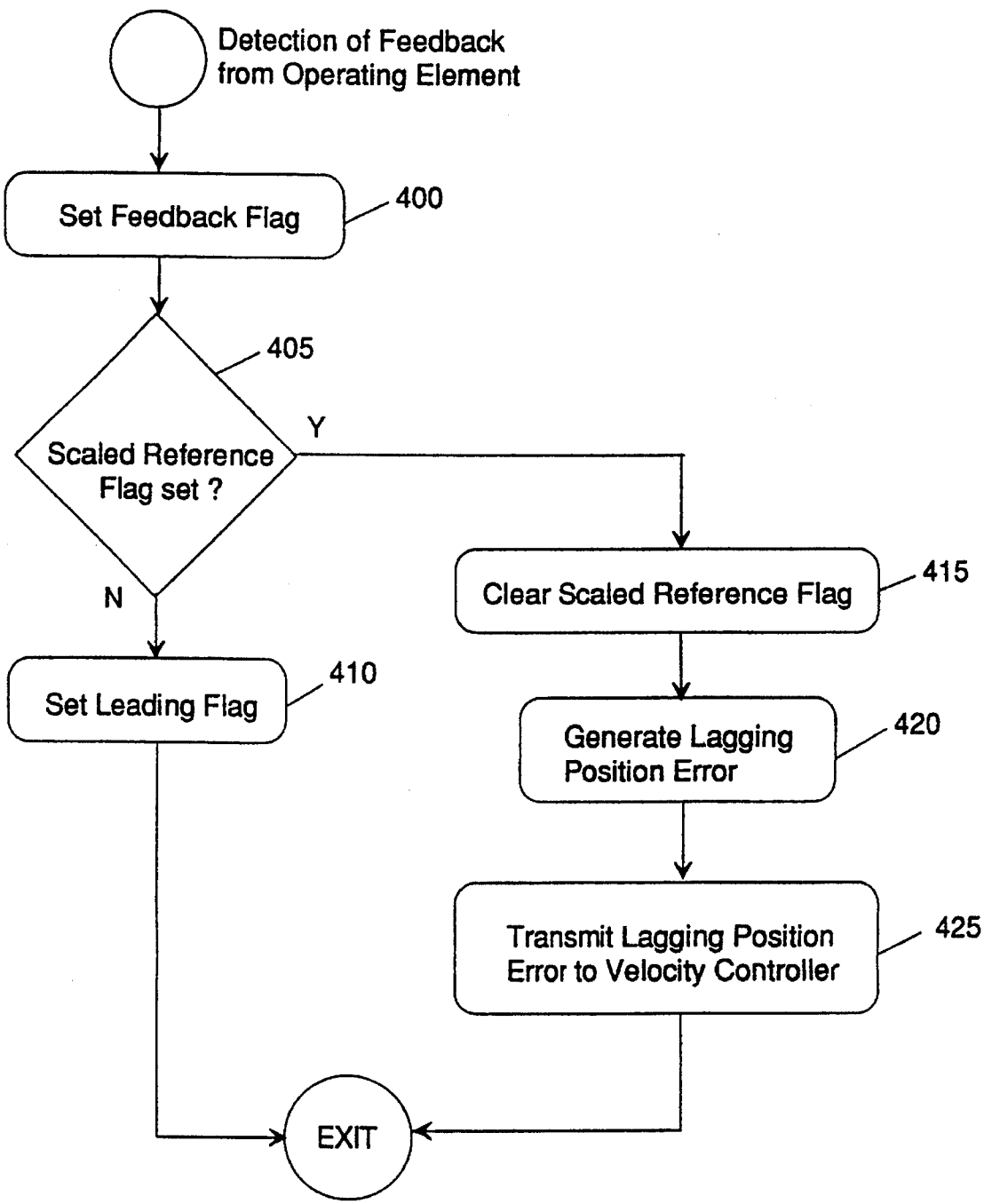
FIG. 5 is a flow chart of programmable element activity for a feedback signal.

FIG. 5 is representative of the action of the programmable element in processing the feedback signal (OE_CLK) 225 from the operating element 5. The feedback signal (OE_CLK) 225 causes the programmable element 2 to examine the scaled reference for the operating element. The programmable element 2 sets the feedback flag 400 and checks if the reference flag is set 405. If the reference flag is not set then two feedback signal positions have occurred in sequence, without an intervening scaled reference signal position occurring, meaning the operating element 5 is leading the scaled reference signal. The programmable element 2 then sets the leading flag 410. If the scaled reference flag is set the programmable element 2 clears the reference flag 415, and generates a lagging position error 420 signal based on this feedback signal occurrence, the previous reference signal occurrence, and a lagging flag and transmits this lagging position error 420 (via control signal 230) to the velocity controller 235.

The velocity controller 235 responds to the position error (control signal 230) by adjusting the velocity of the operating element 5 such that subsequent position error signals are driven to and maintained at a minimum. The velocity controller 235 uses the oscillator 245 as a time base for controlling the velocities of the movable element 1 and the operating element 5.

The relationship between the movable element 1 and the operating element 5 in the preferred embodiment, described above, is a constant. This is the case when there is no reason to correct for mechanical tolerance errors associated with the assembly of the image printing system which cause the geometry of the image placed on the imaging media 110 to be distorted.

However, image distortion can occur for many reasons. The invention can apply the programmable element 2 to the correction of these errors. The programmable element 2 can correct for any position error of the operating element 5 that is a function of the position of the movable element 1 and/or the operating element 5. This is accomplished by including the known error of the element(s) in the relationship used by the programmable element 2 to generate the reference signal for an operating element.

An example of such a condition occurs, in the preferred embodiment, when the axis of rotation of the driven carriage wheel 135 (of the operating element 5) is offset from the center of the wheel. This condition is typically referred to as run-out. This error causes the relative positions of sequential raster lines placed on the imaging media 110 to be other than constant, which degrades the linearity of the image placed on the imaging media 110.

This situation can be corrected by the programmable element 2. The correction is in the form of changing the relationship between the movable element 1 and the operating element 5 from a constant to a variable, which is a function of the position of the carriage wheel 135.

The error in distance traveled per radian of rotation of the carriage wheel 135, due to run-out, can be shown to be a sinusoid with a peak amplitude equal to the offset of the axle from the center of the wheel and a period equal to the circumference of the carriage wheel. This error is measured for each carriage wheel 135. When the carriage wheel 135 is assembled to the encoder 130, the phase relationship of the error signal to the index of the encoder (OE_INDEX) 240 is measured. These measurements constitute the basis for the programmable element 2 to correct for this error. These measurements are stored in non volatile memory accessible to the programmable element 2 and become part of the image printing system associated with the particular carriage wheel 135.

The programmable element 2 can now compute a profile of the error and subtract the error from the normal relationship between the movable element 1 and the operating element 5. The new relationship now has the following form:

$$N - KA\sin\left(\frac{2\pi x}{C} + \theta_0\right)$$

During the imaging process the programmable element 2 uses the above relationship to generate the reference signal for the operating element 5.

The reference signal for the operating element 5 is now a function of the absolute position of the carriage wheel 135. The absolute position of the carriage wheel 135 is known by supplying the programmable element 2 with an index signal (OE_INDEX) 240 input from the carriage encoder 130 which occurs once per revolution of the carriage wheel 135. This index signal (OE_INDEX) 240 defines the position from which the value of $\theta_0$ is measured in the above error relationship. This effectively eliminates the error and linearity is restored to the image placed on the imaging media 110.

The invention can also be applied to an open loop system. This would be the case if the preferred embodiment example were changed such that the carriage assembly (operating element) 5 were driven by a stepper motor. The relationship between the movable element 1 (rotating mirror assembly) and the operating element 5 (carriage assembly) can be realized by using the reference signal for the operating element 5 to generate step pulses to drive the stepper motor at appropriate intervals.

It should be understood that the invention can also be applied to a capstan based image printing system where the imaging media is moving and the rotating mirror assembly (movable element 1) is stationary. The operating element 5 in this case is the capstan. The correction for run-out in this case applies when the axis of rotation of the capstan is offset from the center of the capstan.

It should be understood that the invention can also be applied to image reading systems (image scanners). Where the invention controls the position of the scanning means relative to the image being scanned.

Having described in detail preferred embodiments of our invention, it will now be apparent to those skilled on the art that numerous modifications can be made therein without departing from the scope of the invention as defined in the following claims.

What we claim is:

1. A synchronization apparatus comprising;

a movable element;

an operating element;

means for generating a first reference signal corresponding to an operational position of said movable element;

means for generating a second reference signal corresponding to an operational characteristic of said operating element; and a programmable element, including a clock input for receiving said first reference signal and a data input for receiving said second reference signal, for producing a synchronization control signal in response to said first and second reference signals; and means, responsive to said synchronization control signal, for synchronizing the operational characteristic of said operating element with the operational position of said first movable element.

2. The synchronization apparatus according to claim 1, wherein the synchronization between the operational characteristic of said operating element and the operational position of said first movable element is constant.

3. The synchronization apparatus according to claim 1, wherein the synchronization between the operational characteristic of said operating element and the operational position of said first movable element is variable.

4. The synchronization apparatus according to claim 1, wherein said movable element comprises a first motor and said operating element comprises a second motor.

5. The synchronization apparatus according to claim 4, wherein said first reference signal corresponds to an angular position of said first motor and said second reference signal corresponds to an angular position of said second motor, and wherein, in response to said synchronization control signal, said synchronizing means controls a rotational velocity of said second motor to provide synchronization between the angular position of said first motor and the angular position of said second motor.

6. The synchronization apparatus according to claim 5, wherein the synchronization between the angular position of said second motor and the angular position of said first motor is constant.

7. The synchronization apparatus according to claim 5, wherein the synchronization between the angular position of said second motor and the angular position of said first motor is variable.

8. A synchronized motor assembly for a scanning system comprising:

means for deflecting a scanning beam onto a supply of imaging media supported on a scanning support surface;

a first motor for rotating said beam deflecting means to direct said scanning beam across said imaging media;

a carriage for supporting said mirror;

a second motor for displacing said carriage relative to said scanning support surface;

encoder means for providing a first reference signal corresponding to an angular position of said first motor and for providing a second reference signal corresponding to an angular position of said second motor;

a programmable element, including a clock input for receiving said first reference signal and a data input for receiving said second reference signal, for producing a synchronization control signal in response to said first and second reference signals; and means, responsive to said synchronization control signal, for controlling a rotational velocity of said second motor to provide synchronization between the angular position of said first motor and the angular position of said second motor.

9. The synchronized motor assembly according to claim 8, wherein the synchronization between the angular position of said second motor and the angular position of said first motor is constant.

10. The synchronized motor assembly according to claim 8, wherein the synchronization between the angular position of said second motor and the angular position of said first motor is variable.

11. The synchronized motor assembly according to claim 8, wherein: said first motor rotates said beam deflection means about a first axis; and said second motor displaces said carriage along a second axis substantially perpendicular to said first axis.

12. The synchronized motor assembly according to claim 11, wherein said means for controlling the rotational velocity of said second motor synchronizes a position of said carriage along said second axis with the angular position of said first motor about said first axis.

13. A synchronized motor assembly for a scanning system comprising:

means for deflecting a scanning beam onto a supply of imaging media;

a first motor for rotating said beam deflecting means to direct said scanning beam across said imaging media, said scanning beam forming a scan line on said imaging media;

a second motor for distributing a series of said scan lines across said imaging media;

encoder means for providing a first reference signal corresponding to an angular position of said first motor and for providing a second reference signal corresponding to an angular position of said second motor;

a programmable element, including a clock input for receiving said first reference signal and a data input for receiving said second reference signal, for producing a synchronization control signal in response to said first and second reference signals; and means, responsive to said synchronization control signal, for controlling a rotational velocity of said second motor to provide synchronization between the angular position of said first motor and the angular position of said second motor.

* * * * *